(12) United States Patent
Baclawski

(10) Patent No.: US 6,535,881 B1
(45) Date of Patent: *Mar. 18, 2003

(54) DISTRIBUTED COMPUTER DATABASE SYSTEM AND METHOD EMPLOYING INTELLIGENT AGENTS

(75) Inventor: Kenneth P. Baclawski, Waltham, MA (US)

(73) Assignee: Jarg Corporation, Waltham, MA (US)

( * ) Notice: Subject to any disclaimer, the term of this patent is extended or adjusted under 35 U.S.C. 154(b) by 194 days.

This patent is subject to a terminal disclaimer.

(21) Appl. No.: 09/618,358

(22) Filed: Jul. 18, 2000

Related U.S. Application Data

(63) Continuation of application No. 09/360,011, filed on Jul. 23, 1999, now Pat. No. 6,192,364.
(60) Provisional application No. 60/094,111, filed on Jul. 24, 1998, and provisional application No. 60/094,110, filed on Jul. 24, 1998.

(51) Int. Cl.[7] .......................... G06F 17/30; G06F 15/16; G06F 15/173
(52) U.S. Cl. .................. 707/10; 707/104.1; 709/217
(58) Field of Search .......................... 707/1.3, 5–10, 707/104.1, 103, 200, 201, 203; 709/217–219, 220–224, 202, 203, 236

(56) References Cited

U.S. PATENT DOCUMENTS

| | | | |
|---|---|---|---|
| 5,647,058 A | | 7/1997 | Agrawal et al. |
| 5,655,080 A | | 8/1997 | Dias et al. |
| 5,694,593 A | | 12/1997 | Baclawski |
| 5,926,551 A | | 7/1999 | Dwork et al. |
| 5,931,907 A | | 8/1999 | Davies et al. |
| 6,029,175 A | * | 2/2000 | Chow et al. ................. 707/104 |
| 6,178,449 B1 | * | 1/2001 | Forman et al. ............. 709/224 |
| 6,192,364 B1 | * | 2/2001 | Baclawski ................... 707/10 |

FOREIGN PATENT DOCUMENTS

EP      0882503 A      2/1998

OTHER PUBLICATIONS

Salton, Gerard et al., "Automatic Structuring And Retrieval Of Large Text Files", Communications Of The ACM, Feb. 1994, pp. 97–108, vol. 37, No. 2.
Chakrabarti, Soumen, et al., "Automatic Resource Compilaton by Analyzing Hyperlink Structure and Associated Text", Proceedings 7th International World Wide Web Conference, 1998, [http://decweb.ethz.ch/WWW7/1898/com1898.htm].
Jain, Ranesh, "Content–Centric Computing in Visual Systems", in Del Bimbo, Alberto, "Image Analysis and Processing", Lecture Notes in Computer Science, Proceedings, 9th International Conference ICIAP '97, vol. II, Florence, Italy.
Pirolli, Peter et al., "Silk from a Sow's Ear: Extracting Usuable Structures From the Web", CHI 96, Apr. 13–18, 1996, pp. 118–125, Vancouver, Canada.
Kleinberg, Jon, "Authoritative Sources in Hyperlinked Environment", Proceedings 9th ACM–SIAM Symposium on Discrete Algorithms, 1998, [http://www.cs.cornell.edu/home/kleinber/auth.pdf].
Gibson, David et al, "Inferring Web Communities from Link Topology", Proceedings 9th ACM Conference on Hypertext and Hypermedia, 1998, [http://www.cs.cornell.edu/home/kleinber/ht98.pdf].

(List continued on next page.)

Primary Examiner—Safet Metjahic
Assistant Examiner—Te Chen
(74) Attorney, Agent, or Firm—Kudirka & Jobse, LLP

(57) ABSTRACT

A distributed computer database system connected to a network, e.g., the Internet or on an intranet, indexes interests of agents that have registered with the system, examines information objects, for example, that reside on the network, and, responsive to a match with the registered agents' interests, specifies to the agents the relevant information objects.

20 Claims, 9 Drawing Sheets

OTHER PUBLICATIONS

Arocena, Gustavo et al., "Applications of a Web Query Language", Hyper Proceedings, Sixth International World Web Conference, LaTeX2 translator Version 96.1, (Feb. 5, 1996), Nikos Drakos, Computer Based Learning Unit, University of Leeds.

Weiss, Ron et al., "HyPursuit: A Hierarchical Network Search Engine That Exploits Content–Link Hypertext Clustering", Hypertext '96, pp. 180–193, Washington, DC, USA.

Rivlin,Ehud et al., "Navigating in Hyperspace: Designing a Structure–Based Toolbox", Communications Of The ACM, pp. 87–97, Feb. 1994, vol. 37, No. 2.

Tversky, Amos et al., "Features of Similarity", Psychological Review, The American Psychological Association, Inc., Jul. 1977, pp. 327–352, vol. 84, No. 4.

White, Howard, "Bibliometrics", Annual Review of Information Science and Technology, pp. 119–186, vol. 24, 1989, Elsevier Science Publishers B.V.

Spertus,Ellen, "ParaSite: Mining Structural Information on the Web", Hyper Proceedings, Sixth International World Wide Conference, [http://decweb.ethz.ch/WWW6/Technical/Paper206.html].

Noy, Natalya Fridman, "Knowledge Representation for Intelligent Information Retrieval in Experimental Sciences", Ph.D. Thesis, Northeastern University, Dec. 1997, pp. 2–67.

Rivest,R., "The MD4 Message Digest Algorithm", Request for Comments: 1186, MIT Laboratory for Computer Science, pp. 1–18, Oct. 1990.

Ohta, Yuichi, "Knowledge–Based Interpretation of Outdoor Natural Color Scenes", Institute of Information Science and Electronics, University of Tsukuba, pp. 1–90, Ibaraki 305, Japan.

Fikes, Richard, "Ontologies: What are They, and Where's The Research?", KR'96, Proceedings of the Fifth International Conference, Nov. 5–8, 1996 pp. 652–664.

Santini, Simone, et al., "Image Databases Are Not Databases With Images", in Delbimbo, Alberto, "Image Analysis and Processing", Lecture Notes in Computer Science, 9th International Conference ICIAP '97, Sep. 1997, pp. 38–45, 356–427, Proceedings, vol. II, Florence, Italy.

Salton, Gerard, "Automatic Indexing", Automatic Text Processing: The Transformation, Analysis, and Retreval of Information by Computer, 1989, pp. 275–366, Addison Wesley Publishing Co.

Hurwicz, Mike, "Take Your Data to the Cleaners", Byte Magazine, CMP Media Inc., Jan., 1997, <http://www.byte.com>.

Weldon, Jay–Louise, et al., "Data Warehouse Building Blocks", Byte Magazine, CMP Media Inc., Jan., 1997, <http://www.byte.com>.

Weiss, Sholom, et al., "What Is Data Mining?", Predicting Data Mining, A Practical Guide, Morgan Kaufmann, Publishers, Inc., 1998, pp. 1–58.

Zloof, Moshe M., "Query–By–Example: The Invocation and Definition of Tables and Forms", IBM Thomas J. Watson Research Center, Yorktown Heights, NY.

Wooldridge, Michael, et al., "Intelligent Agents: Theory and Practice", The Knowledge Engineering Review, vol. 10:2, 1995, 115–152.

Campbell, Alistair E., et al., "Algorithms for Ontologiecal Mediation", Department of Computer Science and Center for Cognitive Science, State University of New York at Buffalo, Buffalo, NY.

Baclawski, Kenneth, "An Abstract Model For Semantically Rich Information Retrieval", Northeastern University, College of Computer of Science, Boston, MA Mar. 30, 1994.

Giger, H.P., "Concept Based Retrieval in Classical IR Systems", Proceedings of the International Conference on Research and Development in Information Retrieval, NY, NY, ACM, vol. CONF. 11, pp. 275–289.

Santini, et al.; "Similarity Queries In Image Databases"; Proceedings 1996 IEEE Computer Society Conference on Computer Vision and Pattern Recogniation (Cat. No. 96CB35909), Proceedings of IEEE Conference on Computer Vision and Pattern Recognition, San Francisco, CA, USA; 18–20 Jun. 1996; pp. 646–651; XP002127209; 1996, Los Alamitos, CA, USA, IEEE Computer Society Press, USA ISBN: 0–8186–7258–7 *Section 2.1.2*.

* cited by examiner

FRAGMENT MESSAGE

FRAGMENT RESPONSE MESSAGE

AGENT COMMUNICATION MESSAGE

OBJECT MESSAGE

INSERT FRAGMENT MESSAGE

AGENT REGISTRATION MESSAGE

DISTRIBUTED COMPUTER DATABASE SYSTEM AND METHOD EMPLOYING INTELLIGENT AGENTS

RELATED APPLICATIONS

This application is a continuation of and claims priority from copending, commonly assigned U.S. non-provisional application, Ser. No. 09/360,011, filed Jul. 23, 1999 by Kenneth P. Baclawski, and entitled "Distributed Computer Database System And Method Employing Intelligent Agents"; the disclosures of which are incorporated herein by reference. This non-provisional application, Ser. No. 09/360,011, filed Jul. 23, 1999, now U.S. Pat. No. 6,192,364 is related to and claims priority from copending, commonly assigned U.S. provisional applications, Ser. No. 60/094,111, filed Jul. 24, 1998 by Kenneth P. Baclawski, and entitled "Intelligent Agent Processing System and Method"; and Ser. No. 60/094,110, filed Jul. 24, 1998 by Kenneth P. Baclawski, and entitled "Distributed Object Search System and Method"; the disclosures of which are incorporated herein by reference.

FIELD OF THE INVENTION

The invention relates to computer database systems and more specifically to distributed computer database systems.

BACKGROUND OF THE INVENTION

A large variety of computer software tools have been developed whose purpose is to assist people in their day to day activities, such as word processors, spreadsheets, scheduling software, etc. Most of these software tools require direct interaction with a person to activate their functionality. A new class of software tool is being developed that assists people without requiring direct interaction. For example, software that reminds an individual about an appointment about to take place. Another example would be software that examines a variety of news sources, notifying the user when a relevant article has become available.

A more sophisticated example would be software that not only examines news sources, but also extracts the important features in each article. For example, such software might be watching for announcements of changes in an interest rate. Based on the relevant extracted features, the software would automatically negotiate with other software that is following the stock prices of companies in which the user has an investment, possibly resulting in a stock trade. The user would only be notified after the actions have taken place.

Software of the kind described above is called "agent software" or simply an "agent". An agent is a computer executable program or software artifact whose purpose is to act as a surrogate (or assistant) to a human or another software artifact. More precisely, a software agent is a software-based computer system with the following properties:

1. Autonomy. An agent operates in the "background" as an independent process with control over its actions and state.
2. Socialability. An agent can interact with other agents (and humans).
3. Reactivity. An agent examines its "environment" and responds to changes that occur in it.
4. Pro-activeness. An agent can engage in behavior directed to a goal.

One example of a software agent is an autonomous query for documents on the World Wide Web (WWW), which "crawls" around the Internet looking for documents that satisfy the query. When a document satisfying the query is found, the user is notified and the document is presented.

Agents are currently implemented as independent software systems, each of which is fully responsible for all of its functionality such as examining its environment and detecting changes that are relevant as well as finding and establishing communication with other agents. Such a design does not scale up well to millions of agents, all of whom will be independently examining the environment. For example, in a military system, one might assign an agent to represent every entity of interest in the entire theatre of operations: soldiers, weapons, targets, etc. The number of agents in such a system will be very large, yet the response time requirements of the system are severe.

An agent's environment typically is composed of a stream of information objects, such as, e.g., images, sound or video streams, as well as traditional data objects such as text files and structured documents contained for example in facilities located on a network. As is known in the art, agents can be launched over the network, e.g., the Internet or an intranet, by a search engine to examine the network's environment. The search engine provides each agent with a defined "interest", i.e., a set of objects, typically specified by a user's query. The agent attempts to match its interest with the objects in the environment. The agents return any matched environment objects to the search engine, which then determines the relevance of the returned environment objects with respect to the queries. The environment that the agents are examining can be static, in which the environment constitutes a library of preexisting content, or dynamic, in which the content is a steadily changing object stream, e.g., a news feed.

Further information can be had regarding some of the concepts discussed herein with reference to the following publications:

1 L. Aiello, J. Doyle, and S. Shapiro, editors. *Proc. Fifth Intern. Conf. on Principles of Knowledge Representation and Reasoning*. Morgan Kaufman Publishers, San Mateo, Calif., 1996.

2 K. Baclawski. Distributed computer database system and method, December 1997. U.S. Pat. No. 5,694,593. Assigned to Northeastern University, Boston, Mass.

3 A. Del Bimbo, editor. *The Ninth International Conference on Image Analysis and Processing*, volume 1311. Springer, September 1997.

4 N. Fridman Noy. *Knowledge Representation for Intelligent Information Retrieval in Experimental Sciences*. PhD thesis, College of Computer Science, Northeastern University, Boston, Mass., 1997.

5 R. Jain. Content-centric computing in visual systems. In *The Ninth International Conference on Image Analysis and Processing*, Volume II, pages 1–13, September 1997.

6 Y. Ohta. *Knowledge-Based Interpretation of Outdoor Natural Color Scenes*. Pitman, Boston, Mass., 1985.

7 G. Salton. *Automatic Text Processing*. Addison-Wesley, Reading, Mass., 1989.

8 G. Salton, J. Allen, and C. Buckley. Automatic structuring and retrieval of large text files. *Comm. ACM*, 37(2):97–108, February 1994.

9 A. Tversky. Features of similarity. *Psychological review*, 84(4):327–352, July 1977.

10 M. Woodridge and N. Jennings. Intelligent agents: Theory and practice. *Knowledge Egineering Review*, 10(2):115–152, 1995.

The disclosures of the publications referenced in this "Background of the Invention" are incorporated herein by reference.

While conventional search engines employing agents are generally suited to their intended purposes, certain drawbacks and limitations on their operation may constrain their use in certain applications. For example, networks such as the Internet are realizing significant rates of growth in terms of both number of sites and number of users. For search engines to operate successfully in the near future, they will need to scale to accommodate that growth, perhaps employing tens of millions or more of agents. If all such agents are visiting Internet sites, it can be readily appreciated that latencies will increase and perhaps reach unacceptable levels. The same may become true for large private networks. It would be desirable to provide a search system that scales to accommodate such growth without an appreciable drop in performance.

SUMMARY OF THE INVENTION

The invention resides in a distributed computer database system connected to a network, e.g., the Internet or on an intranet, which indexes interests of agents that have registered with the system, examines information objects, for example, that reside on the network, and, responsive to a match with the registered agents' interests, specifies to the agents the relevant information objects. Consequently, the distributed computer database system performs searches on the network, instead of the agents themselves performing individually the searches as in prior art approaches. As a result, the present invention can support very large numbers of agents seeking information from the environment (i.e., the network). Each agent must register with the system by specifying a query that determines the changes in the environment to which the agent has an interest, and the system provides the agent with information relevant to that query.

More specifically, the invention can be implemented as a distributed computer database system connected to a network, which includes an examination node for examining the network's environment, an index node for indexing agents' interests, and an agent node for storing agents or their locations (e.g., URLs), which collectively form a processing engine for software agents. A software agent is a computer software system that acts autonomously, perceives its environment, interacts with other agents and can engage in behavior directed toward the fulfillment of a goal. Each agent registers its interest with the processing engine. An agent's interest is an object in the same format as the objects that are examined by the processing engine. The processing engine examines an object in its environment with examination nodes. To examine an object, the examination node begins by extracting features from the object, fragmenting the features, and hashing these fragments. Each hashed fragment is transmitted to one index node on the network. Each index node on the network that receives a hashed fragment uses the hashed fragment of the object to perform a search on its respective partition of the database. The results of the searches of the local databases are gathered by the examination node. The gathered results are used to identify those agents for which the object is relevant to the interest of the agent. If it is determined that the object is relevant to an agent, the agent is notified and given access to the object. An agent can locate other agents regarding an object in the search results or for another reason by sending an agent communication message to an examination node. The agents that are located by the examination node are then notified and can communicate with the requesting agent. In this way agents can establish communication with one or more other agents.

In another aspect of the invention, a distributed computer database system includes one or more computer nodes, including examination, indexing and agent nodes, interconnected by a network, which operate as a routing search engine. A user wishing to register an agent with the routing search engine sends a request to an examination node. The examination node assigns an agent identifier (AID) to the agent. The request for registration includes an information object that determines which objects encountered in the environment are of interest to the agent. In a manner similar to that described above, the agent's information object is fragmented, hashed and transmitted to the index nodes, which store data relating the hashed fragment to the AID of the agent. The examination node also transmits any additional agent information, such as its location (e.g., its URL), to one of the agent nodes as determined by the AID of the agent.

For purposes of performing a search, the routing search engine according to this aspect of the invention employs the examination nodes to examine the environment. Examination nodes can include, e.g., Web "crawlers," database scanners, agent registration servers and agent communication servers. When an examination node examines an object in the environment, it extracts the features of the object. Each object feature is then fragmented into feature fragments and these are hashed. A portion of each hashed feature fragment is used by the examination node as an addressing index for identifying one of the index nodes on the network to which the examination node transmits the hashed object feature fragment. Each index node on the network that receives a hashed object feature fragment uses the hashed object feature fragment to perform a search on its respective database. Index nodes finding data corresponding to the hashed object feature return AIDs of the agents that have registered an interest in this feature with the routing search engine. Such AIDs are then gathered by the examination node and a similarity function is computed based on the features that are in common with the object as well as the features that are in the object but not registered by the agent. The similarity function is used to determine whether an agent is to be notified. The AIDs of the agents to be notified are transmitted by the examination node to the agent nodes. A portion of each AID is used by the examination node as an addressing index for identifying one of the agent nodes on the network to which the examination node transmits the AID and object information. Each agent node on the network that receives an AID and object information uses the AID to perform a search on its respective database. Nodes finding data in its database corresponding to the AID use this data to notify the agent that an object has been encountered. The agent node also transmits the object information to the agent. The agent may perform processing, e.g., formatting, of the information and may notify the user who "owns" the agent, e.g., who submitted the query.

BRIEF DESCRIPTION OF THE DRAWINGS

The above and further advantages of the invention may be better understood by referring to the following description in conjunction with the accompanying drawings in which:

FIGS. 1, 2, and 3 in accordance with an embodiment of the invention;

FIGS. 1, 2, and 3 in accordance with an embodiment of the invention;

DETAILED DESCRIPTION OF A PREFERRED EMBODIMENT

At the outset it may prove useful to describe ontology in more detail because notification of agents interested in an object pursuant to the invention is based on an ontology. An ontology models knowledge within a particular domain. For example, a financial services ontology would be used for agents that are observing news reports for information that may be relevant to stock trading. Similarly, a military ontology would be appropriate for agents that represent entities in the theatre of operations. An ontology can include a set of specifications setting forth a concept network, specialized vocabulary, syntactic forms and inference rules for a particular domain. Ontologies in general may include some or all of the following: vocabulary terms and term recognizers, conceptual categories, category classifications, relationships between conceptual categories, weight information that determines the strength of a relationship, syntactic forms for expressing these relationships, and logical inferences for relationships. In particular, an ontology specifies the features that information objects can possess as well as how to extract features from objects. The extracted features are used for determining the degree of similarity between an object and the interest of a registered agent. Each feature of an information object may have an associated weight, representing the strength of the feature or the degree with which the object has the feature.

Figure 1:
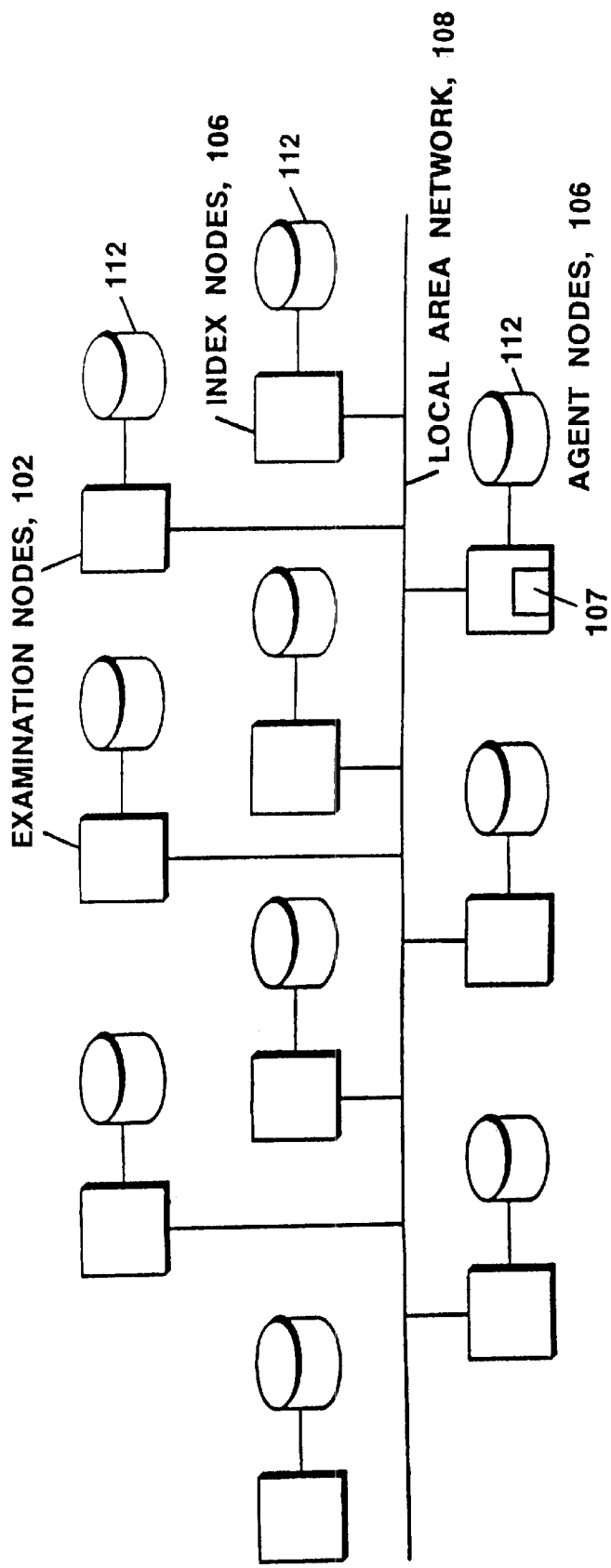
FIG. 1 is a block diagram of an embodiment of the distributed computer database system in accordance with the invention.

Referring now to FIG. 1, in broad overview, one embodiment of a distributed computer database system 100 of the invention includes a routing search engine, which includes one or more computer nodes 102, 104, 106 interconnected, e.g., by a local area network 108. The individual computer nodes 102, 104, 106 may include local disks 112, or may, alternatively or additionally, obtain data from a network disk server (not shown).

The computer nodes 102, 104, 106 of the routing search engine may be of several types, including examination nodes 102, index nodes 104 and agent nodes 106. Each agent node 106 can contain one or more agents 107 or location specifiers (e.g., URLs) that indicate where agents are stored. For simplicity, the following discussion will refer to the agent nodes 106 as containing agents 107. The nodes 102, 104, 106 of the routing search engine need not represent distinct computers. In one embodiment, the routing search engine consists of a single computer, which takes on the roles of all examination nodes 102, index nodes 104, and agent nodes 106. In another embodiment, the routing search engine is composed of separate computers for each examination node 102, index node 104 and agent node 106. Those skilled in the art will realize many variations are possible, which will still be within the scope and spirit of the present invention.

Figure 2:
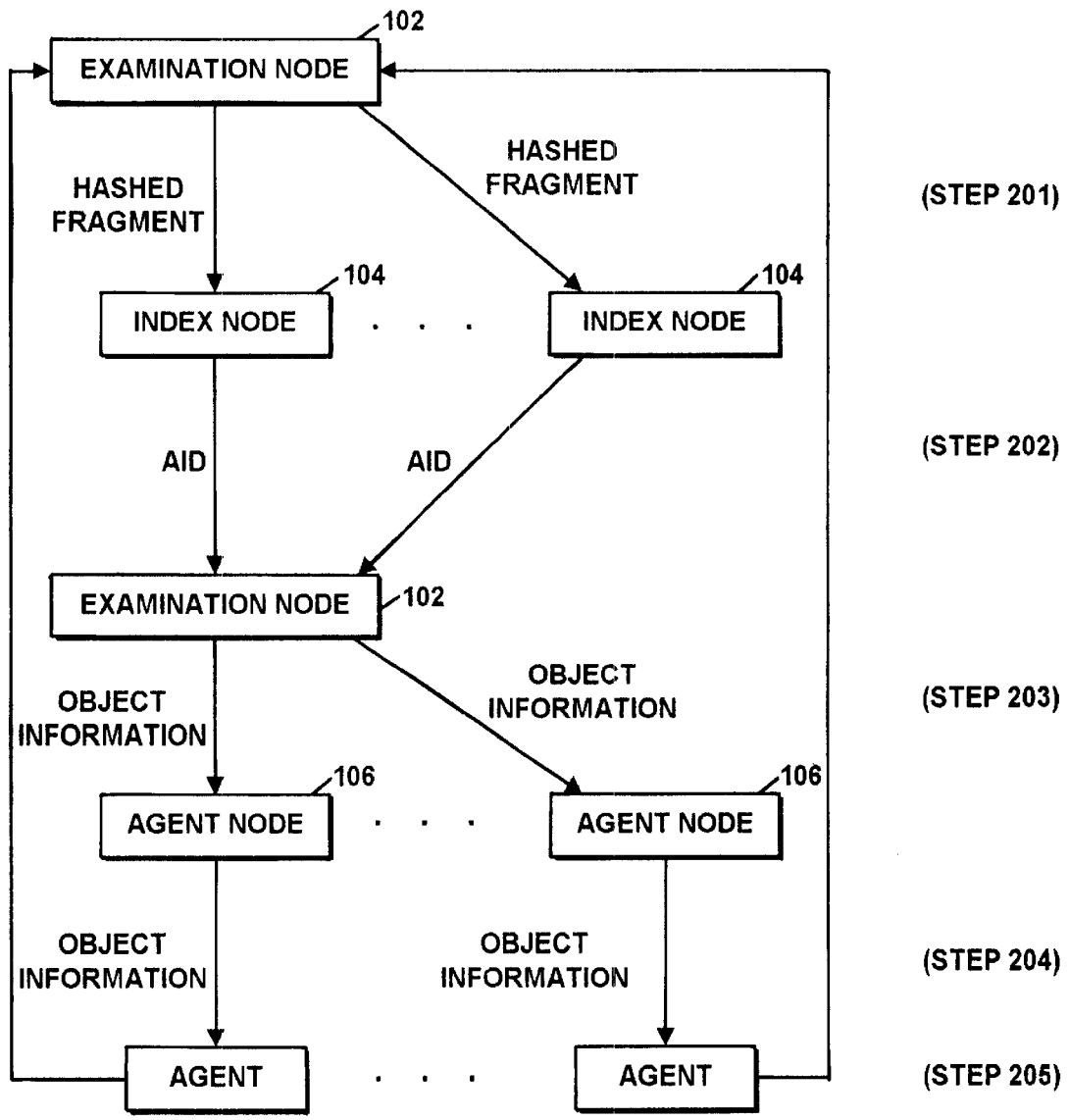
FIG. 2 is a block diagram of the distributed computer database system of FIG. 1 in flow chart form, which illustrates a method of processing information objects in an environment and notifying agents in accordance with an embodiment of the invention.

Considering the processing of an object in the environment first, and referring also to FIG. 2, in one embodiment when an information object is examined, the examination node 102 extracts features from the object according to the ontology. Feature extraction may be performed using traditional techniques for associating values to attributes, such as in relational database records.

Features are extracted from structured documents by parsing the document to produce a data structure, then dividing this data structure into (possibly overlapping) substructures called fragments. The fragments of a structured document are the features extracted from the document. Fragments of an information object are used to find matching fragments in the database, so they are also called probes. This same terminology will be used for features extracted from other kinds of objects as well.

Features are extracted from unstructured documents by using knowledge extraction techniques, described below. Knowledge extraction produces a data structure having a collection of component data structures. The component data structures are then divided into (possibly overlapping) substructures, as in the case of a structured document, and these substructures are the features of the unstructured document.

A large variety of feature extraction algorithms have been developed for media such as sound, images and video streams. Fourier and Wavelet transformations as well as many filtering algorithms are used. Features are extracted from annotations associated with media, such as sound, images, and video streams, using one of the techniques mentioned above, depending on whether the annotation is a relational database record, a structured document or an unstructured document. Each feature can have a value associated with it, and one can specify relationships between features which can also have values associated with them. For example, one feature can be contained within another feature or be adjacent to another feature. The ontology specifies the feature extraction algorithms as well as the structure of the features.

If a feature occurs very commonly in the database, then it does not contribute to the purpose of the search engine; namely, distinguishing those objects that are similar to a particular query. An example is the brightness of an image. Such a feature will be partitioned into a collection of contiguous, non-overlapping ranges of the value associated with the feature rather than the feature itself. Each range of the value is then regarded as a separate feature.

The examination node 102 then encodes each feature fragment of the object by using a predefined hashing function. Data in the system was previously stored locally on the various index nodes using this hashing function to generate an index to the data in the local database. Thus, the use of the same hashing function to generate an index for data storage and to generate hashed feature fragments for an information object assures that (1) data is distributed uniformly over the index nodes of the routing search engine during the storing of data and (2) the feature fragments are scattered uniformly over the index nodes during the processing of an object.

In one embodiment, the hash value resulting from the use of the hashing function has a first portion which serves to identify the index node 104 to which the data is to be sent to be stored or to which an object feature is to be sent as a probe, and a second portion including a local index value which is used to identify storage locations at which data is to be stored or from which data is to be retrieved from the index node 104. Thus, in terms of an object, the hashed object feature fragments are distributed (Step 201) as probes to certain index nodes 104 of the routing search engine, as determined by the first portion of the hash value.

Index nodes 104 whose feature fragments match the index feature fragments by which the data was initially stored on that index node 104 respond to the object by transmitting (Step 202) an agent identifier ("AID") (described below) matching the index terms of the requested information to the examination node 102. Thus all matches between the hashed feature fragments and the local hash table of index terms are returned or gathered to the examination node 102 that initially hashed the object features.

The examination node 102 then determines the degree of relevance similarity of the object to the interest of agent identified by the matched AID. In one embodiment the measure of similarity between the object and the agent 107 is a cosine measure and is given by the expression COS(v, w), where the vector v denotes the object and the vector w denotes the agent. These vectors are in a space in which each feature fragment represents one dimension of the space.

Another commonly used measure of similarity between an object and an interest of an agent 107 is a distance function in the same space mentioned above for the cosine measure. However, there is convincing evidence that human similarity does not satisfy the axioms of a distance function. The model that currently seems to be the most successful approach is the Feature Contrast Model of Tversky, referenced above. In this model, the similarity between an object and an agent's interest is determined by three terms: 1) The features that are common to the object and the agent's interest; 2) the features of the agent's interests that are not features of the object; and 3) the features of the object that are not features of the agent's interest.

The first term contributes a positive number to the similarity value, while the second and third terms have negative contributions. In addition the second and third terms are multiplied by predefined constants such that a feature in the second and third set has less effect on the similarity than one in the first set.

In one embodiment the measure of similarity between the object and the agent's interest is a measure determined by three predefined constants that are used to multiply the three terms occurring in the Feature Contrast Model. In this embodiment, only the first two terms of the Feature Contrast Model are used to compute the measure of similarity, or equivalently, the predefined constant for the third term is set to zero.

In one embodiment all agent interests that generate similarity values greater than a predetermined value are considered sufficiently similar to the object to result in the agents 107 being notified. In another embodiment each agent 107 can specify the minimum similarity value which determines whether the agent will be notified.

Once the similarity is determined, the examination node transmits the AIDs for which the object has been determined to be relevant to the agent nodes 106 (Step 203), which hold information associated with the agents 107 identified by the AIDs. The examination node 102 also transmits object information to each agent node 106. In one embodiment, the object information is the URL for the object. In another embodiment, the object information is the object itself. In another embodiment, the object information is the list of all features of the object and the values of the features for those features that have associated values.

In one embodiment, each AID has a first portion which serves to identify the agent node 106 on which the agent information is stored and a second portion which is the local index value which is used to determine where the agent information is stored in a local table at the agent node 106.

The agent information associated with the AID and stored in the local table is used to notify the agent that an object has been examined which may be relevant to the agent (Step 204). Along with the notification, the agent node 106 transmits object information to the agent. The agent may then respond to the object encountered in its environment.

An agent can communicate with other agents as a consequence of responding to information objects relevant to its interests or for other reasons. For an agent to communicate with other agents, it must either already possess the location of the other agents or else it must locate the other agents. In one embodiment, an agent 107 wishing to interact with other agents constructs an agent communication message and transmits it to an examination node 102 (Step 205). The agent communication message includes object features, which are examined and processed as specified above to determine the agents that have an interest in the object. Then, after notifying the agents, a communication link can be established between each of these agents and the agent that sent the request message.

Figure 3:
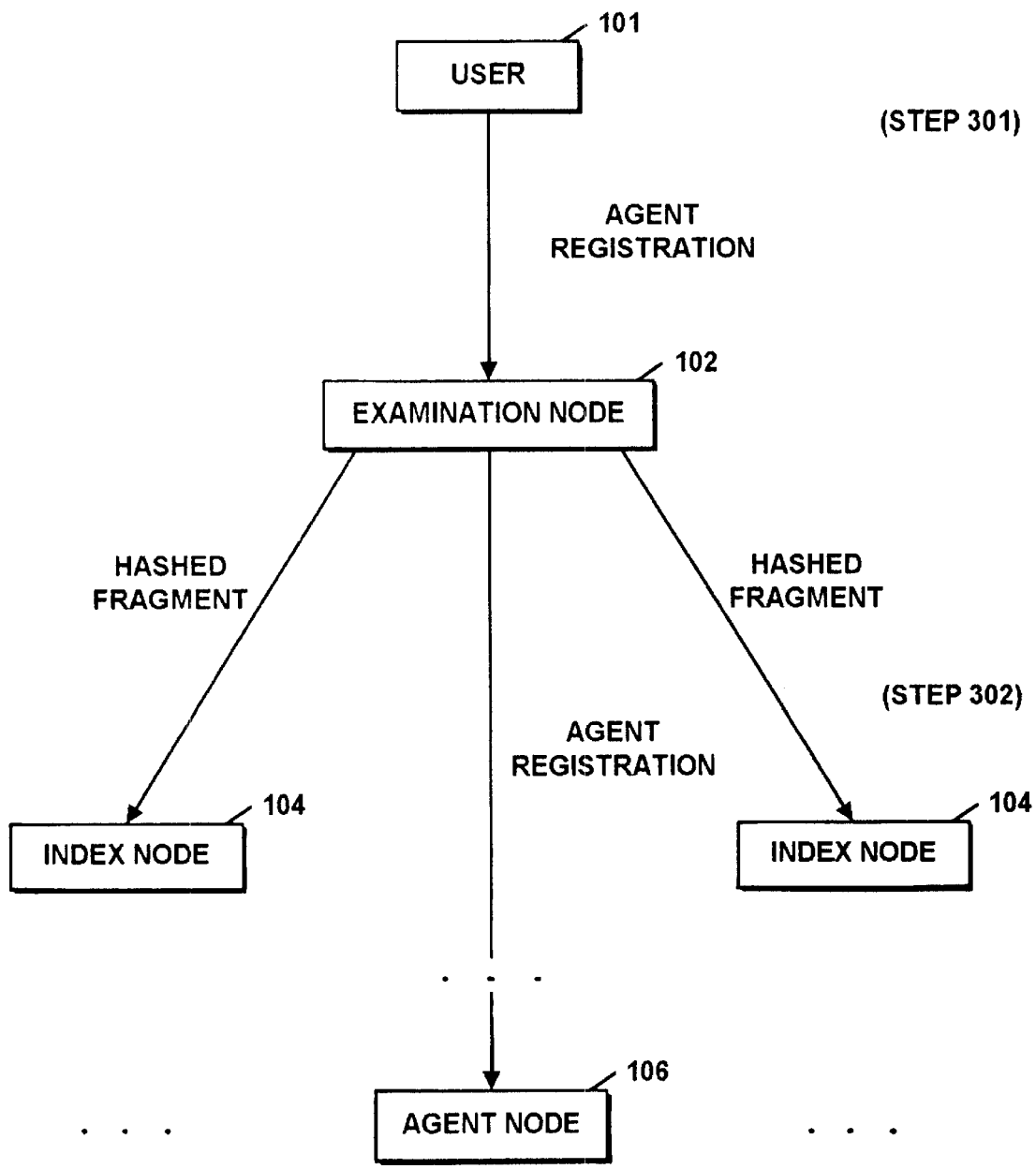
FIG. 3 is a block diagram of the distributed computer database system of FIG. 1 in flow chart form, which illustrates a method of registering an agent in accordance with an embodiment of the invention.

Considering next the processing of a request by a user to register an agent 107 and referring also to FIG. 3, in one embodiment when a request to register an agent 107 is received from a user 101 by an examination node 102 (Step 301), the request includes an object that defines the objects in the environment in which the agent has an interest. The examination node 102 assigns a unique AID to the agent 107, then processes the object as discussed above in the case of examination of an object in the environment (Step 302), except that data associated with the agent is stored in the index nodes 104 and an agent node 106.

Figure 4A:
FIG. 4a–FIG. 4f are block diagrams showing formats for different types of messages that may be used in conjunction with the embodiment of FIGS. 1, 2, and 3.

Considering next the message formats used in the preferred embodiment, and referring to FIG. 4a, an exemplary format for a Fragment Message has four fields: Header 402, Object Identifier (OID) 403, Hashed Object Fragment (HOF) 404, and Value 405. The Header field 402 specifies that this message is a Fragment Message and also specifies the destination index node. The destination index node is determined by the first portion of the hashed object fragment. The OID field 403 contains an object type specifier and an object identifier. The HOF field 404 contains a fragment type specifier and the second portion of the hashed object fragment produced by the Hashing Module. The Value field 405 contains an optional value associated with the fragment. The fragment type specifier determines whether the Fragment Message contains a Value field 405, and if the Fragment Message does contain a Value field then the fragment type specifier determines the size of the Value field.

Figure 4B:
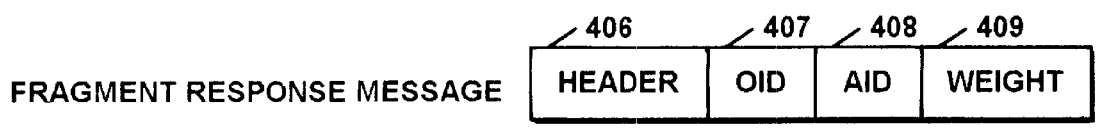

Referring to FIG. 4b, an exemplary format for a Fragment Response Message contains four fields: Header 406, OID 407, AID 408, and Weight 409. The Header field 406 specifies that this message is a Fragment Response Message and also specifies the destination examination node. The destination examination node is the examination node from which the corresponding Fragment Message was received. The OID field 407 contains an object type specifier and an object identifier. The AID field 408 contains an agent type specifier and an agent identifier. The Weight field 409 contains an optional weight associated with the agent. The agent type specifier determines whether the Fragment Response Message contains a Weight field 409, and if the Fragment Response Message does contain a Weight field then the agent type specifier determines the size of the field.

Figure 4C:

Referring to FIG. 4c, an exemplary format for an Agent Communication Message has two parts: Identifier and Feature. The Identifier part has two fields: Header 410 and AID 411. The Header field 410 specifies that this message is an Agent Communication Message and also specifies a destination examination node. The destination examination node is determined by the first portion of the agent identifier. The AID field 411 contains an agent type specifier and an agent identifier. The Feature part contains a number of fields 412 for containing a number of features that are specified by the agent as being relevant to its interest.

Figure 4D:
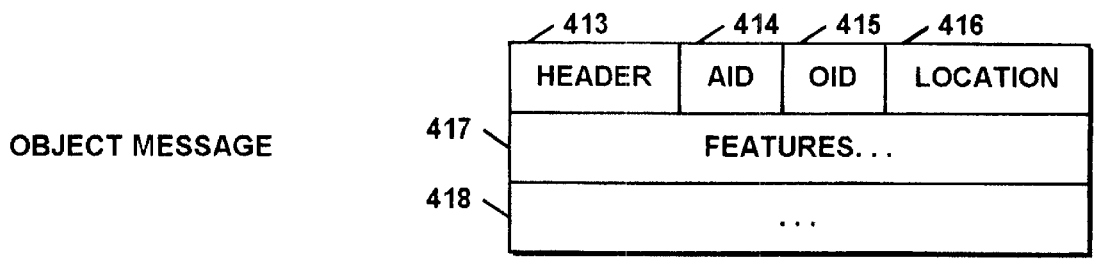

Referring to FIG. 4d, an exemplary format for a Object Message has three parts: Identifier, Feature and Auxiliary. The Identifier part has four fields: Header 413, AID 414, OID 415, and Location 416. The Header field 413 specifies that this message is an Object Message and also specifies the destination agent node. The destination agent node is specified by the first portion of the agent identifier. The AID field 414 contains an agent type specifier and the second portion of the agent identifier. The OID field 415 contains an object type specifier and the object identifier. The Location field 416 contains an optional location specifier such as a URL. The object type specifier determines whether the Object Message contains a Location field 416, and if the Object Message does contain a Location field, then the object type specifier determines the size of the Location field. The Feature part contains a number of fields 417 for containing a number of features associated with the object. The Auxiliary part contains a number of fields 418 for containing auxiliary information associated with the object. The object type specifier determines whether the Object Message contains an Auxiliary part, and if the Object Message does contain an Auxiliary part, then the object type specifier determines the size and structure of the Auxiliary part.

Figure 4E:
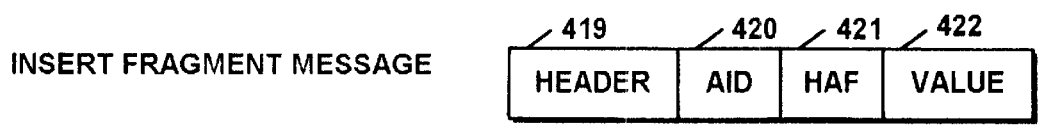
Figure 5:
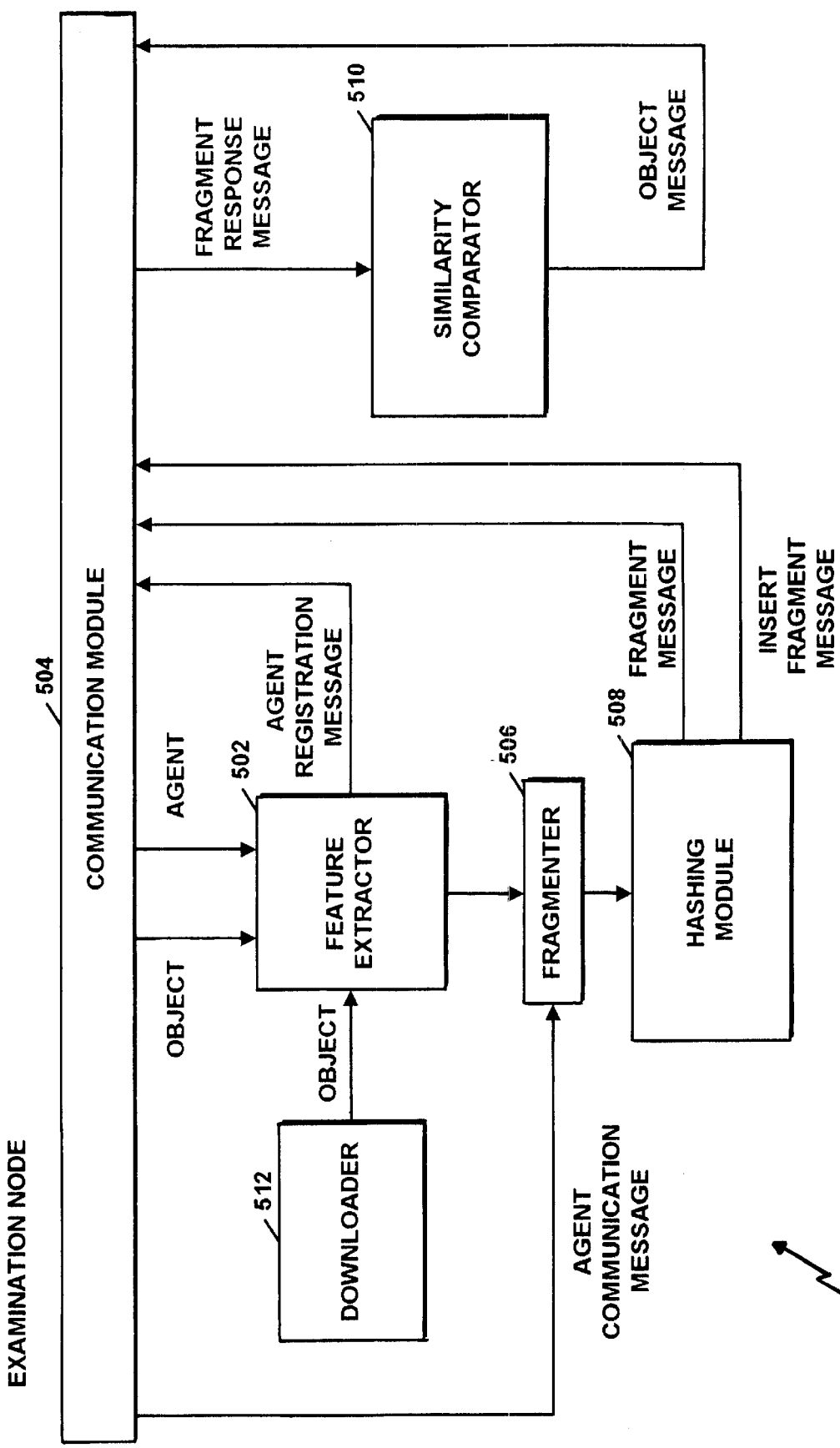
FIG. 5 is a block diagram of a representative one of the examination nodes of FIGS.

Referring to FIG. 4e, an exemplary format for an Insert Fragment Message has four fields: Header 419, AID 420, hashed agent fragment (HAF) 421, and Value 422. The Header field 419 specifies that this message is an Insert Fragment Message and also specifies the destination index node. The destination index node is determined by the first portion of the hashed agent fragment. The AID field 420 contains an agent type specifier and an agent identifier. The HAF field 421 contains a fragment type specifier and the second portion of the hashed agent fragment produced by the Hashing Module (FIG. 5). The Value field 422 contains an optional value associated with the fragment. The fragment type specifier determines whether the Insert Fragment Message contains a Value field 422, and if the Insert Fragment Message does contain a Value field then the fragment type specifier determines the size of the Value field.

Figure 4F:
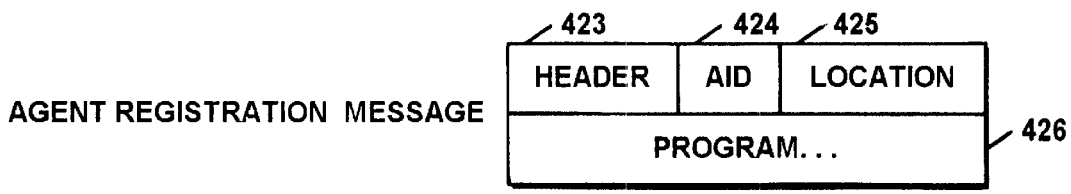

Referring to FIG. 4f, an exemplary embodiment for an Agent Registration Message has two parts: Identifier and Program. The Identifier part has three fields: Header 423, AID 424 and Location 425. The Header field 423 specifies that this message is an Agent Registration Message and also specifies the destination agent node. The destination agent node is determined by the first portion of the agent identifier. The AID field 424 contains an agent type specifier and the second portion of the agent identifier. The Location field 425 contains an optional location specifier such as a URL. The agent type specifier determines whether the Agent Registration Message contains a Location field 425, and if the Agent Registration Message does contain a Location field, then the agent type specifier determines the size of the Location field. The Program part has a number of fields 426 for containing an optional specification of the behavior of the agent. For example, it can contain of an executable program, the source code of a program or a specification of the agent.

Each node of the distributed computer database system includes a Communication Module, discussed below and shown in FIGS. 5, 6 and 7, responsible for transmitting and receiving messages from one node to another. Transmission of a message requires (1) enqueuing of the message prior to transmission over the communication medium, (2) actual transmission over the communication medium, and (3) enqueuing a task to process the message when the message is received by the module determined by the message type. The message type determines the command that is issued to the receiving module. The command determines the means by which the message is to be processed by the module. The destination node for a message to be transmitted is specified in the Header field of each message. When a message is received from another node, the type of message determines which module in the node will process the message. The message type is also specified in the Header field of each message.

Considering next exemplary embodiments of the nodes discussed above, and also referring to FIG. 6, an examination node 500 can contain a Feature Extractor 504 that extracts features from an object or agent interest received from a Communication Module 504. Feature extraction for images is performed by detecting edges, identifying the image objects, classifying the image objects as domain objects and determining relationships between domain objects. In another embodiment, feature extraction for images is performed by computing Fourier or wavelet transforms. Each Fourier or wavelet transform constitutes one extracted feature. The extracted features are transferred to a Fragmenter 506. In addition, when features have been extracted from an object representing the interest of an agent interest, the features are transferred to the Communication Module 504 in the form of an Agent Registration Message.

The Fragmenter 506 computes the fragments contained in each feature. Each fragment is composed of a bounded set of related components in the feature. In one embodiment, the fragments of a feature are composed of each attribute and each relationship in the data structure defining the feature. The fragments are transferred to a Hashing Module 508.

The Hashing Module 508 computes a hash function of a fragment. In one embodiment, the hash function is the MD4 Message Digest algorithm, as set forth in a specification, Request for Comment (RFC) 1186, published by the Network Working Group of the Internet Engineering Task Force, October, 1990, and available over the Internet or from R. Rivest at the MIT Laboratory for Computer Science, Cambridge, Mass., USA. The Hashing Module 508 transfers either a Fragment Message or an Insert Fragment Message to the Communication Module 504, depending on whether the fragment is an object fragment or an agent interest fragment, respectively.

A Similarity Comparator 510 receives Fragment Response Messages and produces Object Messages, which are transferred to the Communication Module 504. The Similarity Comparator 510 gathers all the fragment responses for an object. For each object in the responses, the Similarity Comparator 510 determines the degree of relevance or similarity between each object and agent interest. In one embodiment the measure of similarity between the object and the agent is a cosine measure and is given by the expression COS(v,w), where the vector v denotes the object and the vector w denotes the agent. These vectors are in a space in which each fragment represents one dimension of the space. The most relevant AIDs are transferred to the Communication Module 504 using an Object Message.

A Downloader 512 is responsible for downloading objects. Each examination node 102 may have a different Downloader module. For example, the Downloader can be a Web crawler that finds Web pages on the WWW by extracting hypertext links from the Web pages that have been previously downloaded. For another example, the Downloader 512 can be an Information and Content Exchange (ICE) subscriber that negotiates to obtain content from syndicators. This is the preferred mechanism for obtaining time-sensitive content such as news feeds. For yet another example, the Downloader 512 can download information through a corporate intranet from corporate databases using a data warehousing mechanism.

Figure 6:
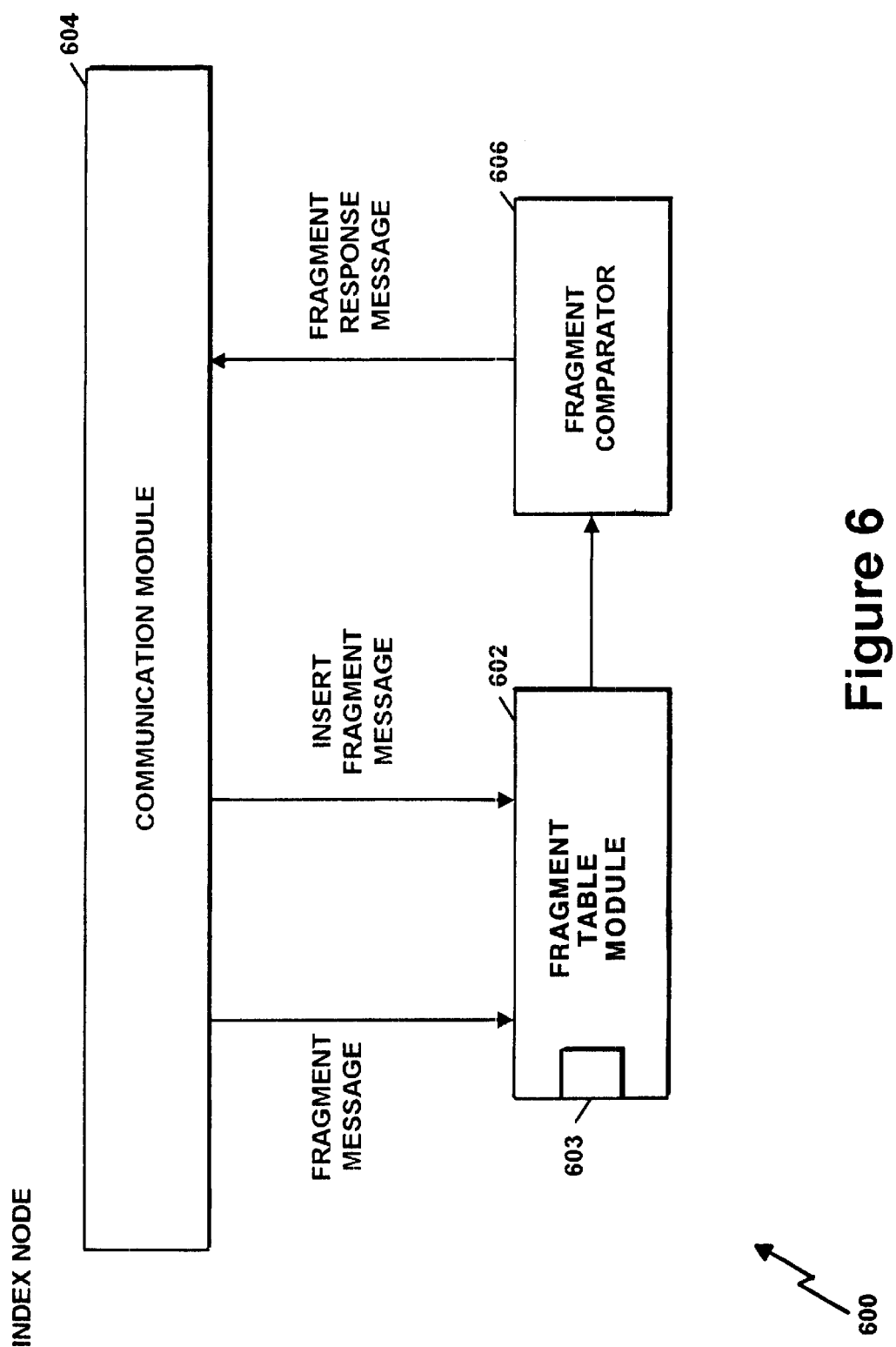
FIG. 6 is a block diagram of a representative one of the index nodes of FIGS.

Referring to FIG. 6, an index node 600 can contain a Fragment Table Module 602 that receives Fragment.Messages and Insert Fragment Messages from a Communication Module 604. In the case of a Fragment Message the Fragment Table Module 602 retrieves an entry in the local hash table 603 using the hash value in the HOF field. The type specifier in the HOF field and the entry in the local hash table 603 are transferred to the Fragment Comparator. In the case of an Insert Fragment Message, the Fragment Table Module 602 modifies the entry in the local hash table 603 determined by the HAF field by appending the AID and Value fields of the Insert Fragment Message to the entry in the local hash table 603.

A Fragment Comparator 606 receives entries from the Fragment Table Module 602. A comparison function is determined by the HOF type specifier that was transferred from the Fragment Table. The comparison function is used to determine the relevance of the AID and Value fields in the entry that was transferred from the Fragment Table Module 602. In one embodiment, the comparison function determines a similarity weight, and the AIDs having the highest similarity weight are deemed to be relevant. The relevant AIDs and their similarity weights are transferred to the Communication Module 604 using a Fragment Response Message.

Figure 7:
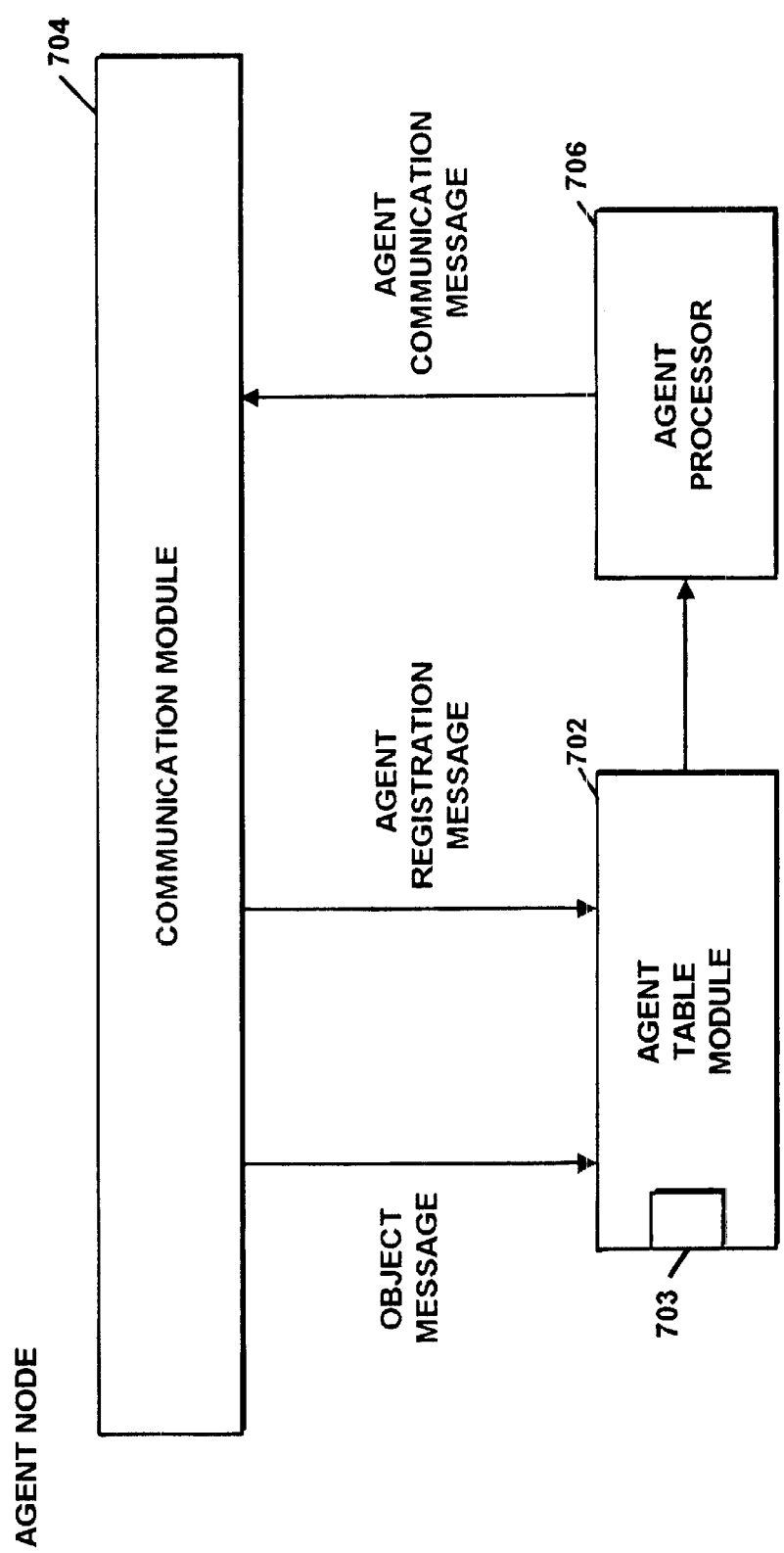
FIG. 7 is a block diagram of a representative one of the agent nodes of FIGS. 1, 2, and 3 in accordance with an embodiment of the invention.

Referring to FIG. 7, an agent node 700 can have an Agent Table Module 702 that receives Object Messages and Agent Registration Messages from a Communication Module 704. In the case of an Object Message, the Agent Table Module 702 retrieves an entry in a local table 703 using the agent identifier in the AID field of the Object Message. The Object Message and the retrieved entry are transferred to an Agent Processor 706. In the case of an Agent Registration Message, the Agent Table Module 702 inserts a new entry in the local table 703 containing information regarding an agent 107. If an entry already exists for the specified agent identifier, then the existing entry is replaced. The new or replacement entry contains the information in the Agent Registration Message.

The Agent Processor 706 receives Object Messages and entries from the Agent Table Module 702. The Agent Processor 706 activates an agent specified by the agent identifier. Activation depends on the agent type specifier in the AID field. The agent type specifier determines how the behavior of the agent is specified in the entry obtained from the Agent Table Module 702. For example, if the entry consists of an executable program, then the Agent Processor 706 executes the program and transfers the data contained in the Object Message to the executing program. For another example, if the entry consists of the source code of a program, then the Agent Processor 706 interprets the program and transfers the data contained in the Object Message to the program being interpreted. For yet another example, if the entry consists of a specification of the agent, then the Agent Processor 706 determines what actions should be performed by the agent based on the specifications and the data contained in the Object Message, and those actions are performed. If the entry only specifies the location of the agent, then the Agent Processor 706 transfers the data contained in the Object Message to the specified location.

Figure 8:
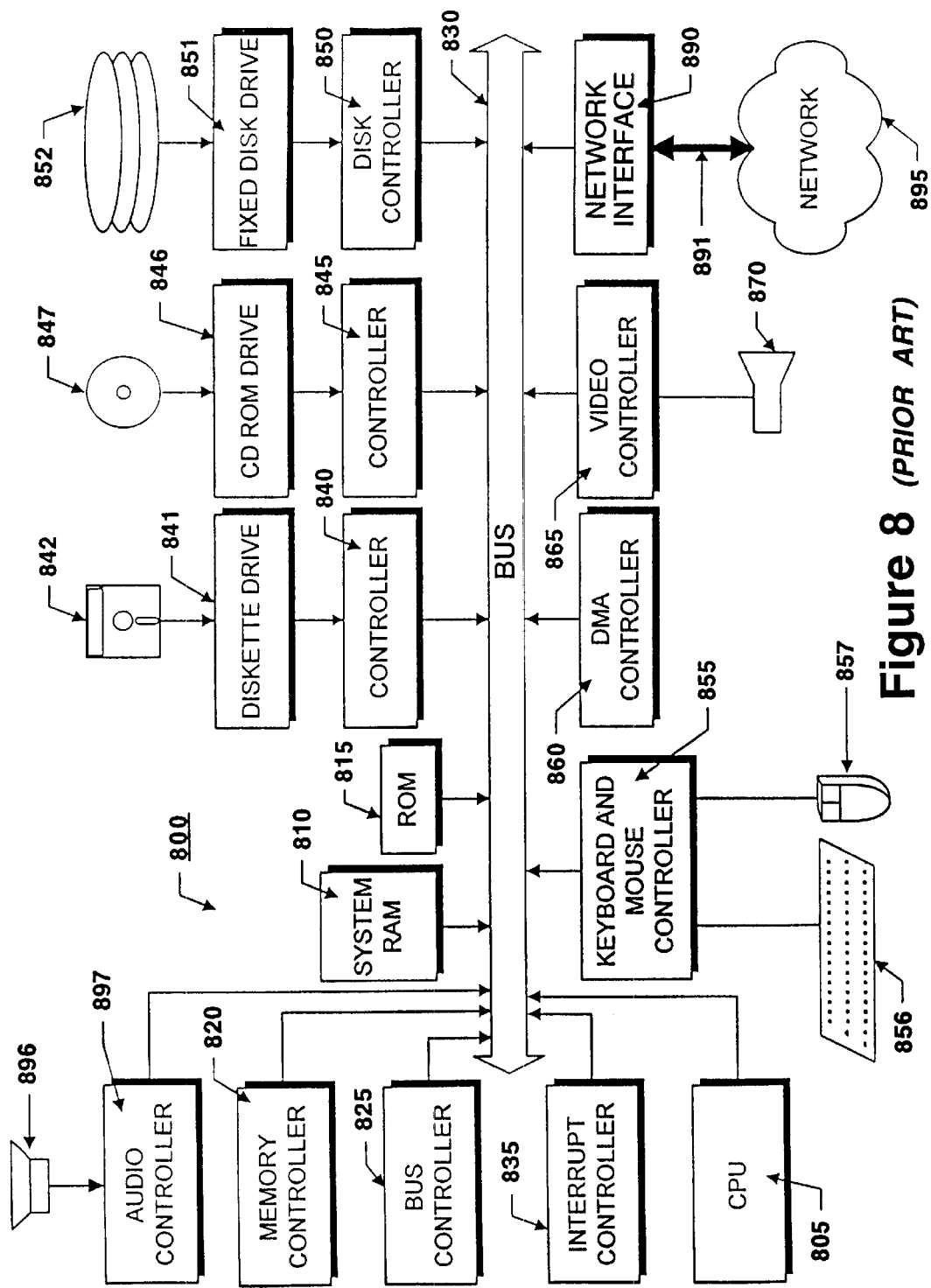
FIG. 8 is a block diagram of a computer system in accordance with an exemplary embodiment of each of the user computer and computer nodes.

FIG. 8 illustrates a conventional system architecture for an exemplary computer system 800. Each of the user computer, front end computer and the computer nodes, including the examination node, index node, and agent node, can be implemented as an instance of computer system 800. The exemplary computer system of FIG. 8 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 8.

The computer system 800 includes a central processing unit (CPU) 805, which may include a conventional microprocessor, random access memory (RAM) 810 for temporary storage of information, and read only memory (ROM) 815 for permanent storage of information. A memory controller 820 is provided for controlling system RAM 810. A bus controller 825 is provided for controlling bus 830, and an interrupt controller 835 is used for receiving and processing various interrupt signals from the other system components.

Mass storage may be provided by diskette 842, CD-ROM 847, or hard disk 852. Data and software may be exchanged with client computer 800 via removable media, such as diskette 842 and CD-ROM 847. Diskette 842 is insertable into diskette drive 841, which is connected to bus 830 by controller 840. Similarly, CD-ROM 847 is insertable into CD-ROM drive 846, which is connected to bus 830 by controller 845. Finally, the hard disk 852 is part of a fixed disk drive 851, which is connected to bus 830 by controller 850.

User input to the computer system 800 may be provided by a number of devices. For example, a keyboard 856 and a mouse 857 may be connected to bus 830 by keyboard and mouse controller 855. An audio transducer 896, which may act as both a microphone and a speaker, is connected to bus 830 by audio controller 897. It should be obvious to those reasonably skilled in the art that other input devices, such as a pen and/or tablet and a microphone for voice input, may be connected to client computer 800 through bus 830 and an appropriate controller. DMA controller 860 is provided for performing direct memory access to system RAM 810. A visual display is generated by a video controller 865, which controls video display 870.

Computer system 800 also includes a network adapter 890 that allows the client computer 800 to be interconnected to a network 895 via a bus 891. The network 895, which may be a local area network (LAN), a wide area network (WAN), or the Internet, may utilize general-purpose communication lines that interconnect multiple network devices.

Computer system 800 generally is controlled and coordinated by operating system software. Among other computer system control functions, the operating system controls allocation of system resources and performs tasks such as process scheduling, memory management, networking and I/O services.

A software implementation of components of the above-described embodiment may comprise computer instructions and routines either fixed on a tangible medium, such as a computer-readable media, e.g. the diskette 842, CD-ROM 847, ROM 815, or fixed disk 852 of FIG. 8, or transmittable via a modem or other interface device, such as communications adapter 890 connected to the network 895 over a medium 891. Medium 891 can be either a tangible medium, including but not limited to optical or hard-wire communications lines, or may be implemented with wireless techniques, including but not limited to microwave, infrared or other transmission techniques. It may also be the Internet. When so transmitted, the software components can take the form of a digital signal embodied in a carrier wave. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims. Therefore, the invention should be construed as limited only as indicated by the scope of the claims.

What is claimed is:

1. Apparatus connected to a network for finding and providing information objects stored on a plurality of nodes in the network to a plurality of independent software agents, each having an interest in selected information objects, the database comprising:

an examining node for registering each of the agents, processing the interest information for each registered agent and sending the processed interest information together with a corresponding ID identifying the each agent to selected nodes in the network;

an indexing mechanism located in each of the plurality of nodes, the indexing mechanism searching the information objects stored on that node in response to processed interest information and, when selected information objects match the processed interest information, returning the selected information objects together with the ID corresponding to the processed interest information to the examining node; and a mechanism in the examining node that provides information objects returned with an ID to the registered agent identified by that ID.

2. The apparatus of claim 1 wherein the examining node comprises a fragmenter that processes the interest information to produce a plurality of interest information fragments and a mechanism for sending each interest information fragment to a selected node.

3. The apparatus of claim 2 wherein the information objects are stored on each node by processing each information object with the fragmenter in order to determine on which node the each information object should be stored.

4. The apparatus of claim 3 wherein fragments of each information object are stored on each node and the indexing mechanism includes a comparator that compares the information object fragments to the interest information fragments to determine a match.

5. The apparatus of claim 1 wherein each independent software agent is initiated by a client and the client registers the each software agent with the examining node.

6. The apparatus of claim 5 wherein each software agent further processes information objects returned to it from the examination node before sending information to the client.

7. The apparatus of claim 1 further comprising an agent node that stores at least some of the agents after registration with the examining node.

8. The apparatus of claim 7 wherein the ID includes information identifying an agent node on which the corresponding agent is stored.

9. A method for finding and providing information objects stored on a plurality of nodes in a network to a plurality of independent software agents, each having an interest in selected information objects, the method comprising:

(a) registering each of the agents in an examination node;

(b) processing the interest information for each registered agent and sending the processed interest information together with a corresponding ID identifying the each agent to selected nodes in the network;

(c) at an indexing mechanism located in each of the plurality of nodes, searching the information objects stored on that node in response to processed interest information and, when selected information objects match the processed interest information, returning the selected information objects together with the ID corresponding to the processed interest information to the examining node; and (d) providing information objects returned with an ID to the registered agent identified by that ID.

10. The method of claim 9 wherein step (b) comprises processing the interest information to produce a plurality of interest information fragments and sending each interest information fragment to a selected node.

11. The method of claim 10 further comprising:

(e) storing the information objects on each node by processing each information object in order to determine on which node the each information object should be stored.

12. The method of claim 11 wherein fragments of each information object are stored on each node and step (c) comprises comparing the information object fragments to the interest information fragments to determine a match.

13. The method of claim 9 wherein each independent software agent is initiated by a client and wherein step (a) comprises using the client to register the each software agent with the examining node.

14. The method of claim 13 further comprising:
(e) using each software agent to further process information objects returned to it from the examination node before sending information to the client.

15. The method of claim 9 further comprising:
(f) storing at least some of the agents after registration with the examining node in an agent node.

16. The method of claim 15 wherein the ID includes information identifying an agent node on which the corresponding agent is stored.

17. A computer program product for finding and providing information objects stored on a plurality of nodes in a network to a plurality of independent software agents, each having an interest in selected information objects, the computer program product comprising a computer usable medium having computer readable program code thereon, including:

program code for registering each of the agents in an examination node;

program code for processing the interest information for each registered agent and sending the processed interest information together with a corresponding ID identifying the each agent to selected nodes in the network;

program code installed in each of the plurality of nodes for searching the information objects stored on that node in response to processed interest information and, when selected information objects match the processed interest information, returning the selected information objects together with the ID corresponding to the processed interest information to the examining node; and program code for providing information objects returned with an ID to the registered agent identified by that ID.

18. The computer program product of claim 17 wherein the program code for processing the interest information for each registered agent comprises program code for processing the interest information to produce a plurality of interest information fragments and sending each interest information fragment to a selected node.

19. The computer program product of claim 18 further comprising program code for storing the information objects on each node by processing each information object in order to determine on which node the each information object should be stored.

20. The computer program product of claim 19 wherein fragments of each information object are stored on each node and wherein the program code installed in each of the plurality of nodes for searching the information objects stored on that node comprises program code for comparing the information object fragments to the interest information fragments to determine a match.

* * * * *